US007841002B2

(12) United States Patent
Golobrodsky et al.

(10) Patent No.: US 7,841,002 B2
(45) Date of Patent: Nov. 23, 2010

(54) METHOD FOR DETECTING A BEHAVIOR OF INTEREST IN TELECOMMUNICATION NETWORKS

(75) Inventors: Oleg Golobrodsky, Petach-Tikva (IL); David Ronen, Givat Shmuel (IL)

(73) Assignee: Ectel Ltd. (IL)

( * ) Notice: Subject to any disclaimer, the term of this patent is extended or adjusted under 35 U.S.C. 154(b) by 873 days.

(21) Appl. No.: 10/265,611

(22) Filed: Oct. 8, 2002

(65) Prior Publication Data
US 2003/0110385 A1    Jun. 12, 2003

(51) Int. Cl.
*G06F 12/14* (2006.01)
(52) U.S. Cl. ...................................... 726/22
(58) Field of Classification Search .................. None
See application file for complete search history.

(56) References Cited
U.S. PATENT DOCUMENTS

| 5,375,244 | A | * | 12/1994 | McNair | 710/200 |
| 5,765,107 | A | * | 6/1998 | Korowajczuk | 455/410 |
| 6,067,535 | A | * | 5/2000 | Hobson et al. | 706/10 |
| 6,681,331 | B1 | * | 1/2004 | Munson et al. | 726/23 |
| 2003/0037010 | A1 | * | 2/2003 | Schmelzer | 705/67 |

FOREIGN PATENT DOCUMENTS

GB    2 321 363    7/1998

OTHER PUBLICATIONS

John Hunt et al.: "*Immunizing against Fraud*", 1996, The Institution of Electrical Engineers, Savoy Place, London.
Jungwon Kim et al.: "*An Artifical Immune Model for Network Instrusion Detection*", 1999, 7th European Congress on Intelligent Techniques and Soft Computing (EUFIT '99), Aachen, Germany, Sep. 13-19, 1999.
Jungonw Kim: "*An Artificial Immune System for Network Intrusion Detection*", 1999, PhD Student Workshop, Genetics and Evolutionary Computation Conference (GECCO '), Orlando, Florida, Jul. 13-17, 1999.
Leandro Nunes de Castro: "Artificial Immune Systems: Part II—A Survey of Applications", 2000, DCA-RT 01/00, XP-001150480.
Burge P et al: "Fraud Detection and Management in Mobile Telecommunications Networks", European Converence on Security and Detection, Apr. 28, 1997, pp. 91-96, XP002085420.

* cited by examiner

*Primary Examiner*—Brandon S Hoffman
(74) *Attorney, Agent, or Firm*—Abraham Hershkovitz; Harold L. Novick; Hershkovitz & Associates, LLC

(57) ABSTRACT

The application describes a method for detecting a behavior of interest in a surrounding including at least one telecommunication network, by using approach of Immune Engineering. The method comprises steps of analyzing the behavior of interest by building a characterizing data string called DNA which comprises two or more data sub-strings characterizing fragments of the behavior of interest and called genes. Further, there are selected two or more data fragments called detectors and being substantially close to the genes, and the detectors are applied to identify similar to them data fragments if appearing in information concerning real time activity in the surrounding. Based on the identification results, the method detects whether the behavior of interest is present in the newly incoming information.

23 Claims, 6 Drawing Sheets

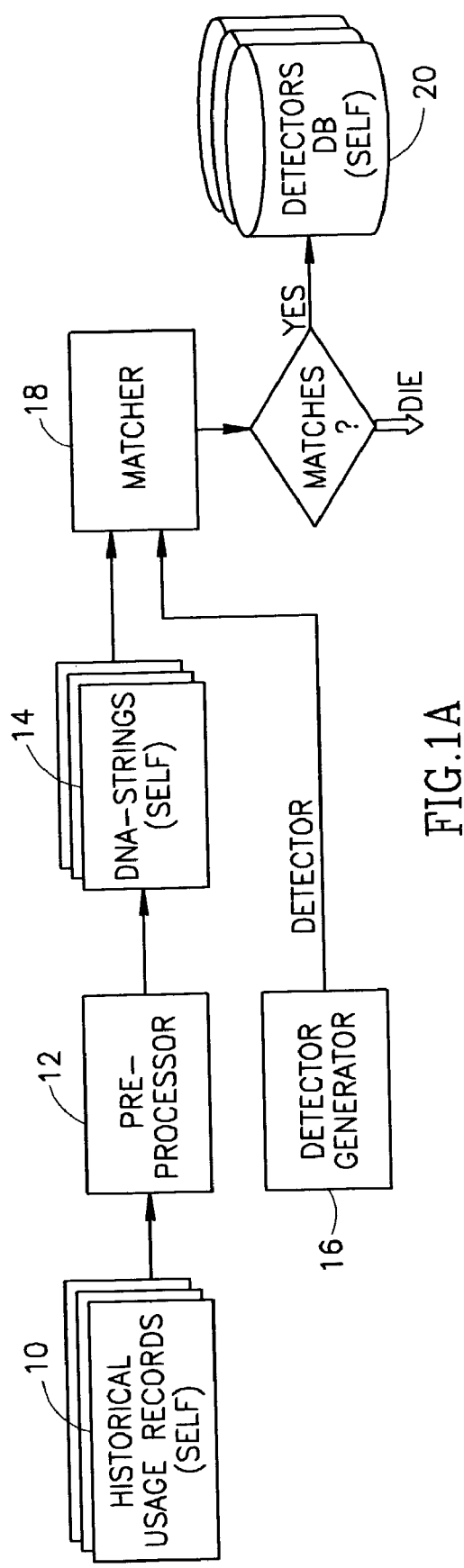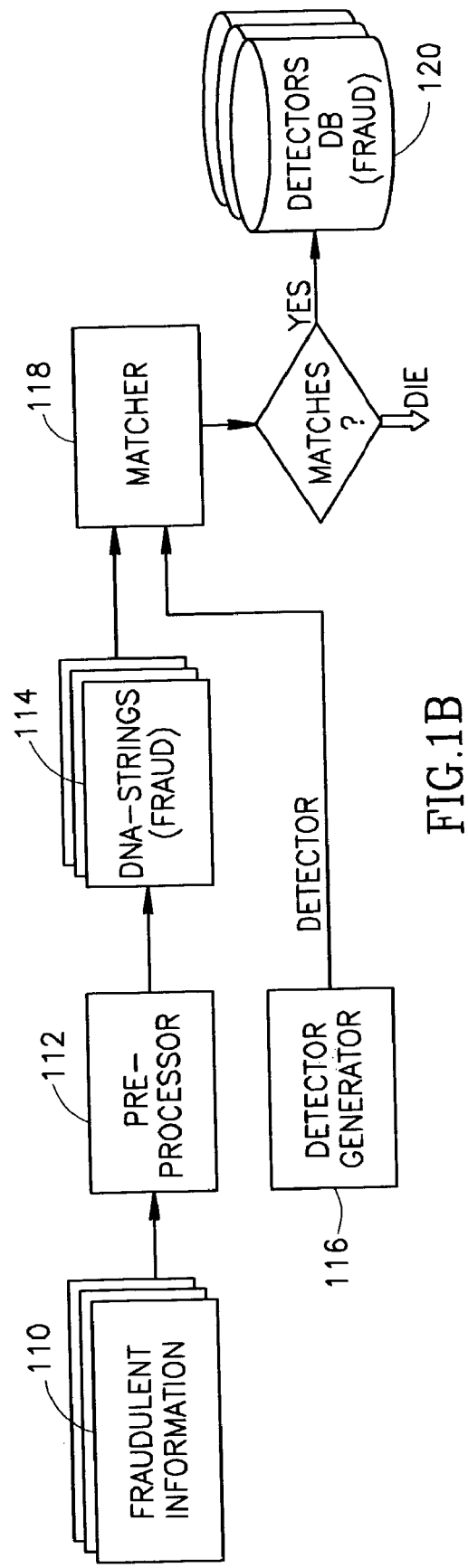

VOICE USAGE RECORDS

| FIELD | NAME | TYPE | VALUE |
|---|---|---|---|
| 1. | TERMINATING NUMBER | STRING | THE DESTINATION PHONE NUMBER |
| 2. | TERMINATING ADDRESS | STRING | THIS FIELD CAN CONTAIN AN IP ADDRESS,#7 POINT CODE AND SO ON,WHICH IDENTIFY THE TERMINATING PARTY. |
| 3. | CALL TYPE | NUMBER | POSSIBLE VALUES ARE TBD |
| 4. | CALL START | TIME DATE | START TIME AND DATE FOR THE CALL |
| 5. | CALL DURATION | TIME | DURATION OF THE CALL |
| 6. | ADDITIONAL SERVICES | STRING | POSSIBLE VALUES ARE TBD |

FIG.4A

LOGIN USAGE RECORDS

| FIELD | NAME | TYPE | VALUE |
|---|---|---|---|
| 1. | RECORD TIME | TIME DATE | |
| 2. | OUTGOING PACKETS | NUMBER | NUMBER OF PACKETS OR FRAMES SENT |
| 3. | OUTGOING BYTES | NUMBER | NUMBER OF BYTES SEND |
| 4. | INCOMING PACKETS | NUMBER | NUMBER OF PACKETS OR FRAMES RECEIVED |
| 5. | INCOMING BYTES | NUMBER | NUMBER OF BYTES RECEIVED |
| 6. | DURATION | NUMBER | DURATION OF THE PROCESS |

FIG.4B

BANDWIDTH USAGE RECORDS

| FIELD | NAME | TYPE | VALUE |
|---|---|---|---|
| 1. | PROTOCOL | NUMBER | MAY CONTAIN TCP, UDP, ICMP, OSPF, OR FUTURE VALUES THE NUMERIC VALUES ARE ACCORDING TO RFC. |
| 2. | SOURCE PORT | NUMBER | THE TCP OR UDP PORT, OR THE APPLICATION NUMBER USED BY THE ORIGINATING PARTY. |
| 3. | DESTINATION PORT | NUMBER | THE TCP OR UDP PORT, OR THE APPLICATION NUMBER USED BY THE ORIGINATING PARTY. |
| 4. | OUTGOING PACKETS | NUMBER | NUMBER OF PACKETS OR FRAMES SENT FROM THE SOURCE TO THE DESTINATION. |
| 5. | OUTGOING BYTES | NUMBER | NUMBER OF BYTES SENT FROM THE SOURCE TO THE DESTINATION. |
| 6. | INCOMING PACKETS | NUMBER | NUMBER OF PACKETS OR FRAMES SENT FROM THE DESTINATION TO THE SOURCE. |
| 7. | INCOMING BYTES | NUMBER | NUMBER OF BYTES SENT FROM THE DESTINATION TO THE SOURCE. |
| 8. | OUTGOING MIN | NUMBER | NUMBER OF OUTGOING BYTES IN FLOWS SAMPLE WITH MINIMAL NUMBER OF BYTES |
| 9. | INCOMING MIN | NUMBER | NUMBER OF INCOMING BYTES IN FLOWS SAMPLE WITH MINIMAL NUMBER OF BYTES. |
| 10. | OUTGOING MAX | NUMBER | NUMBER OF OUTGOING BYTES IN FLOWS SAMPLE WITH MAXIMAL NUMBER OF BYTES. |
| 11. | INCOMING MAX | NUMBER | NUMBER OF INCOMING BYTES IN FLOWS SAMPLE WITH MAXIMAL NUMBER OF BYTES. |
| 12. | OUTGOING AVG. DEVIATION | NUMBER | AVERAGE DEVIATION OF NUMBER OF OUTGOING BYTES BETWEEN FLOW SAMPLES |
| 13. | INCOMING AVG. DEVIATION | NUMBER | AVERAGE DEVIATION OF NUMBER OF INCOMING BYTES BETWEEN FLOW SAMPLES |
| 14. | AGGREGATION DURATION | TIME | DURATION OF THE AGGREGATION |

FIG.4C

IP FLOWS USAGE RECORDS

| FIELD | NAME | TYPE | VALUE |
|---|---|---|---|
| 1. | SOURCE ADDRESS IP | STRING | THIS FIELD CONTAINS THE IP ADDRESS, WHICH IDENTIFIES THE FIRST/SOURCE PARTY. |
| 2. | DESTINATION ADDRESS IP | STRING | THIS FIELD CONTAINS THE IP ADDRESS, WHICH IDENTIFIES THE SECOND/DESTINATION PARTY. |
| 3. | PROTOCOL | NUMBER | MAY CONTAIN TCP, UDP, ICMP, OSPF, OR FUTURE VALUES. THE NUMERIC VALUES ARE ACCORDING TO RFC. |
| 4. | SOURCE PORT | NUMBER | THE TCP OR UDP PORT, OR THE APPLICATION NUMBER USED BY THE ORIGINATING PARTY. |
| 5. | DESTINATION PORT | NUMBER | THE TCP OR UDP PORT, OR THE APPLICATION NUMBER USED BY THE ORIGINATING PARTY. |
| 6. | OUTGOING PACKETS | NUMBER | NUMBER OF PACKETS OR FRAMES SENT FROM THE SOURCE TO THE DESTINATION. |
| 7. | OUTGOING BYTES | NUMBER | NUMBER OF BYTES SENT FROM THE SOURCE TO THE DESTINATION. |
| 8. | INCOMING PACKETS | NUMBER | NUMBER OF PACKETS OR FRAMES SENT FROM THE DESTINATION TO THE SOURCE. |
| 9. | INCOMING BYTES | NUMBER | NUMBER OF BYTES SENT FROM THE DESTINATION TO THE SOURCE. |
| 10. | FLOW START | TIME DATE | START TIME AND DATE FOR THE FLOW |
| 11. | FLOW DURATION | TIME | DURATION OF THE FLOW |

FIG.4D

METHOD FOR DETECTING A BEHAVIOR OF INTEREST IN TELECOMMUNICATION NETWORKS

FIELD OF THE INVENTION

The present invention relates to methods of detecting any type of behavior of interest and of identifying fraudsters in telecommunication networks.

PRIOR ART

In a highly competitive market environment, survival of network providers relies mainly on the network's ability to offer constant innovation, variety, flexibility and quality in delivering new services and merchandise to millions of users worldwide. High-value services such as VoIP, content delivery, video-on-demand, e-commerce and electronic transactions, are carried out over Next Generation Networks, placing Telecom (Telco) & Service Providers at higher risk of fraudulent attack than ever before. Fraud includes various activities performed by individuals or a group making use of a network or networks in a way which is not authorized, approved or intended by the network, in order to gain undue profit or cause damage to the operator or a 3rd party.

As fraudulent activities in the field of computer and telecom networks are becoming increasingly frequent, their detection is becoming increasingly important. Telecommunications fraud poses an annual multi-billion dollar problem to Telcos and Service Providers alike. International scams of a highly sophisticated technological nature have recently been associated with organized crime, cleverly employing self-educated fraud techniques and the assistance of hacking specialists. Once fraudsters find a weakness in the Telco/Service Provider environment, they will quickly and aggressively exploit it. Organized criminals and other intruders expect the breach to be eventually discovered, and therefore employ all means available to maximize their revenues as quickly as possible.

Telcos & Service Providers demand an adequate means for protecting their networks, resources and services.

Fraud Management is primarily concerned with the possibility to detect and prevent fraudulent activities causing constant painful losses. An effective fraud management solution must be powerful and flexible, easily adapted to changing environments, and support the rapid introduction of new services, advanced billing schemes & new network technologies. A powerful and complete fraud analysis solution includes various systems and tools that provide detection, investigation, and recording of fraudulent and malicious activities in the network. These enable the service provider to take subsequent actions while preventing the activities that inflict the most (financial) damage, and assisting the prosecution of fraudsters. Various fraud detection components are available to the Telcos & Service Providers.

Accordingly, various approaches exist for the fraud detection. The following are common approaches:

Threshold approach, being the most common form of quantitative analysis. In the threshold fraud detection, certain attributes of a user and the system behaviors are characterized in terms of counts, with some level established as permissible. The classic example of a threshold is a number of unsuccessful logins to a system. Heuristic threshold checks take the simple threshold detection a step further by adapting it to observed levels. This process increases the accuracy of the detection, especially when performing detection over a wide range of users or target environments. So, for instance, instead of having a detection rule triggering an alert when the number of failed logins exceeds three within an hour period, it is possible to create a detection rule that calculates an "abnormal" number of failed logins before alerting. The calculation may be done based on statistical formulas (such as the Gaussian function or a chi-square function) and a standard deviation model.

Neural networks. Neural networks use adaptive learning techniques to characterize any anomalous behavior. This non-parametric analysis technique (i.e., a numeral technique) operates on historical sets of training data. The network is considered a graph that consists of numerous simple processing elements called units that interact by using weighted connections. The knowledge of the net is encoded in the structure in terms of connections and their weights. Although training a net could be time-consuming, a trained neural net can speedily predict new cases. They can also be used in data mining applications for clustering, handwriting recognition, robot control. Output from the net is purely predictive. Since there is no descriptive component to a neural network model, a neural net's choice is hard to understand, and in fact, this technique is referred to as a "black box" technology. The key difference between neural networks and other techniques is that the neural networks are built from nodes having numerical coefficients and only operate directly on these numbers. As a result, any non-numeric data must be converted to numbers before one can use the data in the net.

Fraud analysis rules determine particular conditions as to which patterns or events in the network usage information (usage records) are considered suspicious and will generate alarms. The rules can define logical conditions that are built using a field (parameter) in a usage record against a particular value. A usage record contains information in the form of fields (parameters) about a service after the service is started to be delivered. For example, CDR (call details record) is a usage record of a telephone conversation. A condition "telephone conversation of a particular client is less than 30 sec" can be written down as "duration is <30 sec", where duration is a parameter, 30 sec is the value. The rules may also use ranges of values, lists of values (e.g., a so-called Hot destinations list, or a black list). For instance, alarms may be produced when a monetary transaction exceeds a certain amount or when a call is placed to specific destinations. Rules can define conditions or aggregated values over a specific period of time such as, for instance, the sum of duration of calls. Rules defined by the user may vary depending on a specific time period, so allowing the use of different rules during day, night, weekends, etc.

On the other hand, there is known a so-called Artificial Immune Model being a computational system based upon metaphors of natural immune systems. It comprises data manipulations, classification, reasoning and representation methodologies, that follow a plausible biological paradigm.

Likewise, Immune Engineering is a meta-synthesis process that uses the information contained in a problem itself to define a solution tool to the given problem, and then apply the solution tool to obtain a solution.

Some articles describe implementing Artificial Immune Model for preventing money transaction frauds [John Hunt et al. *Immunizing against fraud IEE*, Savoy place, London], and for Network intrusion detection [Jungwon Kim. *An Artificial Immune System for Network Intrusion Detection*; Jungwon Kim and Peter Bentley. *An Artificial Immune Model for Network Intrusion Detection*]. Both groups of the references relate to frauds in computer networks. In particular, an intrusion detection system (IDS) is defined as an automated system for the detection of computer system tampering. The main goal of an IDS is to detect unauthorized use, misuse and abuse of computer systems by both the system insiders and external intruders. Building of a network-based IDS is inspired by a human immune system, i.e., is based on so-called detectors (information blocks) known from the Artificial Immunity Model. The detectors are considered analogous to genes in real immune systems.

It should be emphasized that the problem of unauthorized intrusion significantly differs from problems of fraud in telecommunication networks, for example in next generation (combined) networks where fraud problems are much more complex.

SUMMARY OF THE INVENTION

The present invention proposes a method for detecting a behavior of a previously known type in surroundings including at least one telecommunication network, by using methods of Immune Engineering based on the Artificial Immune Model.

In particular, the invention proposes a method for detecting fraud or fraudulent behavior in such surroundings using approaches of Immune Engineering.

The proposed technique can be applied in a surrounding including at least one field from the following non-exhaustive list which comprises: Next Generation Networks, Internet, Voice/VoIP, and also in credit card and bank transactions, e-mail, and Calling Card services.

The central concept of the approach is as follows:
a method of detecting a behavior of interest in a surrounding including at least one of the above-mentioned fields, by using a data string characterizing the behavior of interest, the data string comprising data sub-strings characterizing fragments of the behavior of interest.

The method comprises general steps of:
analyzing the behavior of interest by obtaining a data string characterizing said behavior and called DNA, the data string comprising two or more data sub-strings characterizing fragments of the behavior of interest and called genes;
selecting two or more data fragments called detectors and being substantially close to said data sub-strings respectively;
applying said detectors to identify similar data fragments in newly incoming information concerning activity in the surrounding;
based on the identification results, judging whether the behavior of interest is detected in the newly incoming information.

According to the preferred version, the method is focused at
analyzing behavior of interest of a particular customer, by pre-building and further using the obtained data string characterizing behavior of interest of a particular customer, the data string comprising data sub-strings characterizing the behavior fragments of the customer. This method will be called a Fingerprinting method or technique.

Using terminology of the methods of Immune Engineering based on the Artificial Immunity Model, the sub-strings reflecting behavior fragments of the customer can metaphorically be compared to genes, and the characterizing data string formed from the sub-strings—to a DNA sequence.

We therefore will call the data string characterizing behavior of a customer as DNA of the customer, and the sub-strings of the DNA—as genes of the DNA.

However, according to another version, the method can be focused on detection of a specific type of fraud in the surrounding, and the method of analyzing behavior in the surrounding will be based on using a pre-built data string characterizing a fraudulent behavior of interest in the system (surrounding), the data string comprising one or more data sub-strings characterizing fragments of the fraudulent behavior of interest. The pre-built data string will be called a fraud DNA, wherein those one or more data sub-strings composing the fraud DNA will be called fraud genes. These fraud genes may be known in advance in the system (say, to an expert of the system), and the fraud DNA is usually pre-built directly from these fraud genes.

The above-described method will be further referred to as a fraud detection method.

Coming back to the fingerprinting method, the characterizing data string (DNA) should be first created which would reflect the behavior of interest of a customer.

The behavior of interest may be, for example, a regular or normal behavior which can be studied, say by a service provider in a telecommunication system for offering specific programs or discounts to the customers with such a behavior.

Of course, the focus of the fingerprinting method is placed on abnormal or fraudulent behavior of a customer that should be tracked after. For example, if such a behavior is noticed once, it can then be studied and formulated using the proposed method in order to catch a similar type of behavior in future and so prevent possible damages to a service provider.

To create the DNA, usage records reflecting the behavior of interest of the customer (usually, the archive "historic" usage records) can be pre-processed for obtaining there-from a number of genes in the form of data sub-strings, upon which the obtained genes can be composed into the characterizing data string like into a chain, using any separation marks. The genes may reflect, for example, a terminating telephone number used by the customer with a particular frequency, duration of calls of the customer, IP addresses and the frequency of their use, type of call (voice, fax, data), bandwidth characteristics of the calls, their start time, login strategy, etc.

For building the characterizing data string (DNA), weight coefficients can be used, associated with the sub-strings (genes).

The method of detecting the behavior of interest, upon creating the DNA, further comprises step (b) of selecting a set of one or more detectors, each being a data fragment relevant to the data string (DNA); the detectors being selected (i.e., are considered relevant) when each of them is substantially close to a particular gene of the DNA.

The criterion of "being substantially close" can be defined in various ways. For example, a first data sub-string of length L is considered substantially close to a second data sub-string of length L if the first one comprises "r" contiguous bits of the second one (where r is smaller than the length L). In such a case, the first data sub-string can be considered a detector relevant to the DNA comprising a gene being the first data sub-string. Of course, a detector is substantially close to a gene also if it completely coincides to the gene.

In the proposed process, selecting the detectors for the set can be provided in a number of ways, for example
by randomly generating data sub-strings of various lengths and comparing thereof with the pre-built DNA, more particularly with genes of the DNA to select among these sub-strings relevant detectors for the set;
by generating such data sub-strings which are substantially close to respective genes of the DNA (i.e., relevant in advance); this option also includes selecting detectors being simply equal to the genes.

Upon selecting the set of detectors relevant to DNA of the customer's behavior of interest (normal, or abnormal=fraudulent), a stage of studying the behavior of interest is terminated.

Now, the selected detectors can be applied to perform a so-called distributed analysis of newly incoming information representing activity of any client in said surrounding, thereby performing step (c) of analyzing behavior of customers in the surrounding (both for the technology of fingerprinting, and the technique of fraud detection).

For example, the detectors relevant to the DNA of the behavior of interest can be compared with incoming information contained in real time data bases of the surrounding (say, a telecommunication network), i.e. with fragments of a real time behavior of an arbitrary customer.

To do that, during a search in the real data bases, behavior of an arbitrary customer is checked from the point of presence in it such behavior fragments which are similar to the genes of the characterizing DNA; therefore such data sub-strings which may comprise said fragments are extracted from the real time data bases and further compared with the previously selected set of detectors.

For extracting the data sub-strings of interest from the real time data bases, first so-called aggregated usage records are built for a particular customer, and then the usage records are preprocessed similarly to the way the historic usage records were preprocessed for obtaining the genes of the DNA.

The information for obtaining the aggregated usage record with such sub-strings of interest can be found in a random bulk of data contained in real time data bases such as CDR—Call Detail Records.

Each real data behavior fragment can be identified to match to the search (i.e., considered to correspond to a suitable characterizing detector) with a probabilistic approach. For example, the before-mentioned method of any r-contiguous bits can be used for this purpose.

The data sub-string obtained from the real time data base, which matches to one or more detectors from the set of detectors, is taken into account for further consideration.

In other words, the distributed analysis of the incoming information comprises extracting fragments of said newly incoming information which fragments may be similar to the genes of said DNA, collecting and processing said fragments into aggregated usage records, and applying said detectors by comparing the aggregated usage records with the selected detectors to determine a percent of detectors of the set matching to the fragments of said aggregated usage records.

When, for an arbitrary customer, one or more such fragments (data sub-strings) are found during any period of time selected for searching, and said data sub-strings in total (i.e., the aggregated usage records) match to a predetermined number or percentage of detectors from the selected set, wherein a critical percentage of the identified detectors in the set is estimated by a predetermined threshold, behavior of this arbitrary customer is considered to match to the behavior of interest characterized by the DNA.

In other words, if a fraudster had been noticed in the past to behave with a fraud in this and/or other network, field or surrounding (and caught or not caught at that time), this fraudster can be identified and caught in future by the proposed fingerprinting technique, if he (she) tries to use the previously used technology of fraud. However, the fingerprinting can be successfully used for other purposes, say, for allocating one or more clients in a particular telecom network, having the pattern of behavior defined by the pre-built characterizing data string. In this case, the pre-built data string and data detectors characterize a special manner of behavior of an individual which is required to the provider for statistics, offering a new service, discounts, or the like purposes.

The fingerprinting can preferably be used as a technique for preventing fraud which does not involve immediate fraud detection, but enables:

pointing an unknown arbitrary customer as a probable fraudster due to similarity of the unknown customer's current behavior to the previous fraudulent behavior of a particular known fraudster.

As has been mentioned above, the concept of Immune Engineering is used in the above-described algorithm of fingerprinting in surroundings including at least one telecommunication network.

As has also been mentioned, the concept of Immune Engineering is applicable to more simple cases—just for cases of fraud detection in surroundings such as telecommunication networks, where characterizing data strings are pre-built using two or more abnormal situations in quite standard fraudulent behavior of subscribers with the provider, for example: entering a fraudulent subscription data and encountering further inconsistencies due to that.

Such data strings, though generally are also considered DNAs, will be called fraud DNAs. The component fraud genes are usually considered to represent fraud detectors as are and can be stored in so-called fraud detectors data bases.

The data strings of fraud DNAs may be shorter than the DNAs built for fingerprinting, and are standard not for a specific customer, but for the particular system where the suitable types of fraud are looked for.

Fraud detection can therefore be provided by comparison of real information incoming the network, with the fraud detectors stored in the detectors' database. To do that, the incoming information (say, taken from CDRs) is granulated into aggregated usage records, per customer, using a list of CDR fields (i.e., particular data fragments or sub-strings from CDR) which may match the fraud detectors. The aggregated usage records are built from the incoming information using the same processing rules, as those used for obtaining genes and building DNAs. The fraud is detected when there is found an aggregated usage records unit which comprises fragments matching to quite a lot (a sufficient percentage) of pre-selected fraud detectors.

Therefore, the fraud detection method comprises steps of:

storing said one or more fraud detectors in a fraud detectors' data base, creating aggregated usage records of a number of respective customers, using newly incoming information stored in real time data bases, by selecting for said aggregated usage records data fragments from the real time data bases according to the processing rules applied for obtaining genes for building DNA;

comparing each of the aggregated usage records with contents of the fraud detectors' data base, confirming the fraud detection whenever defining the aggregated usage records of at least one customer, comprising a number of data fragments matching said fraud detectors, wherein said number (of data fragments) exceeds a predetermined matching percent.

Both the fraud detection technique, and the fingerprinting technique require a preliminary stage of creating a data base (a set) of characterizing detectors, which can be called the stage of training the system on the behavior of interest.

The characterizing detectors' database can be created as follows:

obtaining a pre-built characterizing data string (DNA), for example by pre-processing initial information presenting a particular type of behavior (either normal or fraudulent) in a telecommunication network thereby creating the DNA being a binary succession comprising a combination of two or more fragments (genes), said combination of fragments being sufficient to make said DNA characterizing the particular type of behavior;

generating a plurality of different data sub-strings respectively suitable to said two or more fragments (genes) of the characterizing data string (DNA) by having respectively the same lengths;

matching each of the generated sub-strings with said string, considering one or more specific generated sub-strings to be detectors if matching a particular fragment (gene) of the string (DNA) at least partially, storing thus obtained detectors in the detector's database.

So, there are three conditions for selecting the generated detectors to be stored in the data base of detectors: they are to be of a predetermined length(s), there should be a minimal number of specific detectors which are sufficient for identification of the behavior of interest, the detectors are to be different and should match to genes of the DNA according to a selected matching principle (say, a partial matching principle of r-contiguous common bits).

According to the above principle, the following detectors' data bases can be created in a system:

detectors' data base for specific fraudulent behavior of a user X in the network;

detectors' data base for specific normal behavior of a user Y in the network.

detectors' data base for fraudulent behavior in the network;

detectors' data base for normal behavior in the network.

The detectors generation is preferably performed continuously, i.e., the detectors' data base can be updated from time to time.

According to the proposed technique, the detectors stored in the detectors' database preferably have a life span depending on their activity, i.e. the frequency of their use for comparing with the real data (the newly incoming information or aggregated usage records). Most active (coinciding) detectors are able to become constant members of the detectors' data base, while the minimally active ones may be replaced with new ones.

The invention will be described in more detail using the preferred embodiments illustrated below.

BRIEF DESCRIPTION OF THE DRAWINGS

FIG. 1a illustrates a block-diagram of the training stage of the method and a part of the system performing the method, namely a subsystem for building a model of normal behavior.

FIG. 1b illustrates a block-diagram of the training stage of the method and a subsystem for modeling a fraudulent behavior, for further detecting such a behavior.

FIGS. 4a-4d illustrate particular examples of usage records which may be used for building DNAs or aggregated usage records, fields of the records being related to genes composing DNAs.

DETAILED DESCRIPTION OF THE PREFERRED EMBODIMENTS

Figure 2:
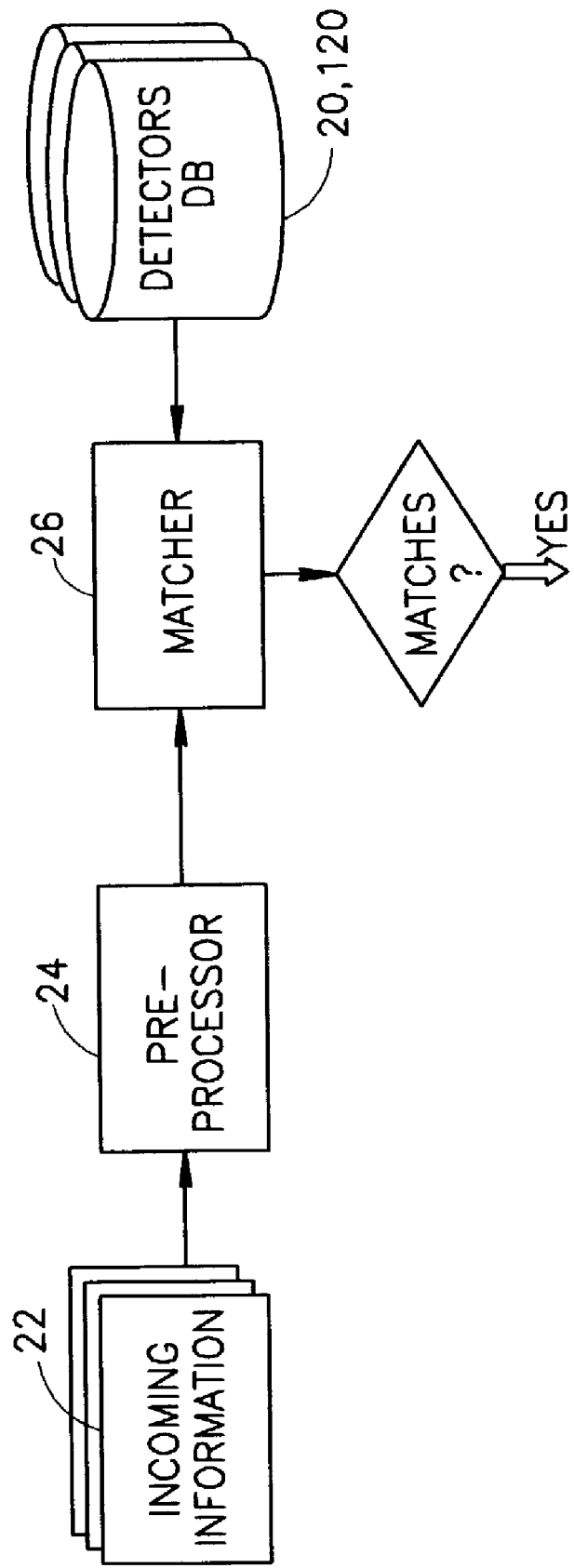
FIG. 2 illustrates a block-diagram showing how the trained system detects a specified type of behavior using the detectors' data base.

Let us explain the block diagram of training, which is shown in FIG. 1a, on a particular example. As has been mentioned, FIG. 1a illustrates a concept of training the system (let it be called an Immune Engineering system) for further performing various operations, for example—for further use in the fingerprinting technique for recognizing the client. In our example, we will demonstrate the system training for a normal typical behavior of a particular client, and will use the fields (parameters) which form some usage records of telephone calls. Let the usage records will be voice usage records, fields of which are illustrated in a table shown in FIG. 4a.

The training is started by extracting information from a usage records database 10 which stores "historic" information on regular behavior of a number of clients. Information stored in 10 comprises various usage records. For example, there are records related to telephone sessions being voice conversations, faxes or data transmissions, initiated by a number of clients of a particular network. The data base 10 may comprise other usage records, such as IP flows usage records, Login usage records, Bandwidth usage records.

We will explain the block-diagram with the aid of Example 1:

In our example, we extract the voice usage records of a particular client identified by his (her) telephone number (say, # 1111111) from the data base 10, and forward them to pre-processing in block 12.

Let, in our example, the pre-processing is applied only to three fields out of six fields of the voice usage records shown in FIG. 4: field 1 (Terminating number), field 3 (Call type) and field 5 (Call duration). Say, for the purposes of our analysis field 2 is not used since it is identical to field 1 for the voice usage records, field 4 (start time of the call) is considered not important for the example, and additional services (field 6) used during the call—such as entering a credit card number by the keyboard—are not taken into account.

In this example, the pre-processing is performed for a predetermined characterizing period of time. The pre-processing of the terminating number constitutes coding of the (7 to 14)-digit number into a 4-digit number. Three possible types of call sessions (voice, fax and data) can be coded by 5 binary digits, and then re-coded by 2 digits. Say, the voice calls are indicated by "10", faxes by "15" and data calls by "25". The call duration is extracted from the call records in the form of a binary register which does not overcome any changes in the pre-processing block 12.

The pre-processed information belonging to three fields of the voice usage records is entered into a block 14 for building a DNA string of a regular behavior of the client of interest. Block 14 may form a number of DNA strings for a number of clients, DNA string(s) for a regular behavior in the system; such strings are marked "self". The DNA is built as follows:

let the client used the voice services 40 times during the predetermined period of time, and called to three terminating numbers respectively pre-processed as 1235(10 times), 2678(20 times) and 1000 (10 times).

let, from those calls, the client spoke by phone (code "10") 10 times, and sent data (code "25") 30 times.

let, a mathematically expected value D is taken for duration of the call sessions, and it can be written as a range: 5 seconds<D<1 hour 32 minutes.

Based on the above information, the characterizing string (DNA) of the client of interest can be built using separation marks (for example, ":"):

$$1235(10)2678(20)1000(10){:}10(10)25(30){:}5''{\sim}1\,h\,32', \qquad (1)$$

where
- the first portion of the string up to the first separation mark reflects the used termination telephone numbers (sub-strings or genes) and the respective frequencies of calls to these numbers, the frequencies being put in brackets;
- the middle portion up to the second separation mark reflects the used types of call sessions (other sub-strings or genes), and the respective frequencies (in brackets);
- the last portion just shows the expectation of the call sessions' duration which was found characteristic for the client during the predetermined period.

Now, to learn characteristic elements (genes) of the DNA data string, a detector generator 16 starts generating random or pseudo-random detectors some of which may serve as data sub-strings of the DNA. In our example, there is no need in generating sub-strings of the type of call since there can be only three exact types known in advance and those three types can be taken as are to be detectors of the type of call. It is also useless to generate detectors of the call duration since the duration is already defined by the range in the DNA. In our example, the detector generator 16 generates detectors 10, 15 and 25 comparable to the type of call, and 4-digit sub-strings comparable to the coded Terminating numbers. To shorten the time to be spent for this process, the generator 16 may generate 4-digit combinations comprising r contiguous positions. Say, r=3 and the combinations list comprises such detectors as: 1230, 1231, . . . 2350, 2351 . . . 2670, . . . etc.

The generated detectors are sent to a matcher block 18 where they are compared to the genes of the DNA string. If a particular generated detector matches to a particular gene in the DNA string, this particular generated detector will be stored in a Detectors database 20. Actually, if the detectors are generated randomly, there will be such of them to be thrown away; however, if the detectors are generated pseudo-randomly, all of them will be stored in the database 20.

The database 20 may accumulate multiple sets of detectors, each set being formed for a particular client (subject).

FIG. 1*b* illustrates a block-diagram similar to that shown in FIG. 1*a*, but intended for training the system to a particular type of fraudulent behavior. All blocks of the block diagram are marked similarly to those in FIG. 1*a*, just by adding the digit 1 before their number. A data base 110 will comprise usage records concerning fraudulent activities of various kinds. Let's explain how the principle works, using Example 2.

In this example, the fingerprint engine receives all the historic URs (User Records) of a certain fraudster. The fraudster DNA is built based on the information coming from these URs (marked as 110). We will determine that fraudster as Fraudster.

Preprocessing of Incoming URs is performed in a pre-processor block 112. Assume that block 112 received all the URs 110 that were generated from Fraudster activities. Suppose that according to the Fraudster's URs:

Fraudster has used the company services 400 times, so 400 URs were received.

Fraudster called to the following terminating numbers respectively pre-processed as:

1235 (100 times); 2033 (130 times); 2122 (90 times) 3434 (50 times); 2678 (20 times); 1000 (10 times)

Fraudster used the following services respectively pre-processed as:

10 (300 times). Note: code '10' means 'speaking by phone'. 25 (100 times). Note: code '25' represents 'sending data'.

Fraudster called to the following area codes:

03 (30 times); 02 (200 times); 001516 (170 times)

DNA Building is performed at block 114.

We will set weights, based on the above occurrences through a so-called Weight Function which can be defined as follows.

Prior Definitions:
- n=Number of counters (for example, a number of used terminating numbers; a number of used services; a number of used area codes, etc)
- $c_i$=Counter of index i, i=$\overline{1\ldots n}$ (for example, counter of a particular terminating number—how much calls were made to this number)
- $w_i$=Weight value for $c_i$, i=$\overline{1\ldots n}$ (for example, weight of calling to a particular terminating number)

The Weight Function Description:

$$w_i = \frac{c_i * \sum_{1}^{n} c_i}{\sum_{1}^{n} c_i^2}$$

Note: the following assumption always exists:

$$\frac{w_i * c_i}{\sum_{1}^{n} c_i} = 1$$

The importance of that assumption is that there is no affect of the weight mechanism on the overall counting (summary of all the counters). There is only different division of the overall counting (give to one, take from another . . . ). So, we can set the weight mechanism off, for certain fields, without harming the overall behavior.

Following are the calculated weight values:

Fraudster's called terminating numbers:
1235 (100 times), weight=1.05; 2678 (20 times), weight=0.21 1000 (10 times), weight=0.11; 3434 (50 times), weight=0.52 2122 (90 times), weight=0.94; 2033 (130 times), weight=1.36

Used services:
10 (300 times), weight=1.24; 25 (100 times), weight=0.4

Area codes:
03 30 times), weight=0.17; 02 (200 times), weight=1.14 001516 (170 times), weight=0.97

Based on the above information, the characterizing string (DNA) of the client can be built from "genes" using separation marks (":"):

$$1235(1.05)2678(0.21)1000(0.11)3434(0.52)2122(0.94)2033(1.36){:}\\10(1.24)25(0.4){:}03(0.17)02(1.14)001516(0.97) \qquad (2)$$

where:
The first portion of the string up to the first separation mark reflects "genes" formed from the used termination telephone numbers and the respective weights of calls to these numbers (the weights being put in brackets).

The middle portion up to the second separation mark reflects "genes" formed from the used types of call sessions and the respective weights (in brackets).

The last portion comprises "genes" reflecting the called area codes and the respective weights (in brackets).

Detectors Generation (block 116) in Example 2 is performed just from the whole genes values. There will be no manipulation (like sub-string or randomizing) on the genes' values.

In yet a further example, the usage records may comprise information reflected in tables shown in FIGS. 4A and 4B, concerning cases where one or more clients in the past performed a specific known type of fraudulent behavior in the system, for example with respect to a Login technique for further use of IP services.

However, other combinations of genes are possible, even such similar to those typical for the fingerprinting technique. Using such information, the system is able to build a data string called a fraud DNA to detect any attempt of using the system according to such a fraud again. Also in this case, there will be necessary to select detectors of such a fraud characteristic string. The technology of building a fraud DNA and selecting detectors for that, though being similar to the part of fingerprinting technique described in the Examples 1 and 2, slightly differs from that in obtaining the characterizing genes.

Example 3

Concerning the Fraud Detection Technology

Suppose, we have received from an Expert several parameters, that, for his(her) opinion, characterize a type of fraud which is typical for the system. Let us also, for the example's sake, consider these parameters to be "Used services", "Area code" and "Called terminating telephone number". So, these three parameters in a combination undoubtedly describe the fraud.

3.1 Parameter "used services", just for the example, will be any of the two codes of the used services:
  "10": "25".
3.2 Parameter "area code":
  "03"; "02"; "001516".
3.3 Parameter "called terminating number" can be any of the following codes of such numbers:
  1235, 2678, 1000, 3434, 2122, 2033. The Expert presents the coded numbers, which are further hashed (randomized) to obtain fraud parameters as follows:
    "0235", "1235", "2235" ... "9235"
    "1230", "1231", "1232" ... "1239"
    "0678", "1678", "2678" ... "9678"
    "2670", "2671", "2672" ... "2679"
    "0000", "1000", "2000" ... "9000"
3.4. The fraud DNA can be built according to the above-proposed scenario, where the fraud genes are considered to be equal to the fraud parameters presented, without weight coefficients.
3.5. Fraud detectors will be considered to be equal to the fraud genes, r respectively.

FIG. 2 illustrates a block diagram for detecting matching genes in the information reflecting incoming usage records. It can be used both for terminating the fingerprinting method, and for the fraud detection technology.

In FIG. 2, block 22 illustrates data bases of current incoming information or current usage records. Block 24 signifies pre-processing of the incoming usage records so that they might be compared (block 26) with detectors stored in the detectors' data bases 20 or 120. If, for a particular task of fingerprinting or fraud detection, a considerable number of the stored detectors match to a considerable number of fragments in the usage records, it is likely that the behavior of interest is allocated.

Figure 3:
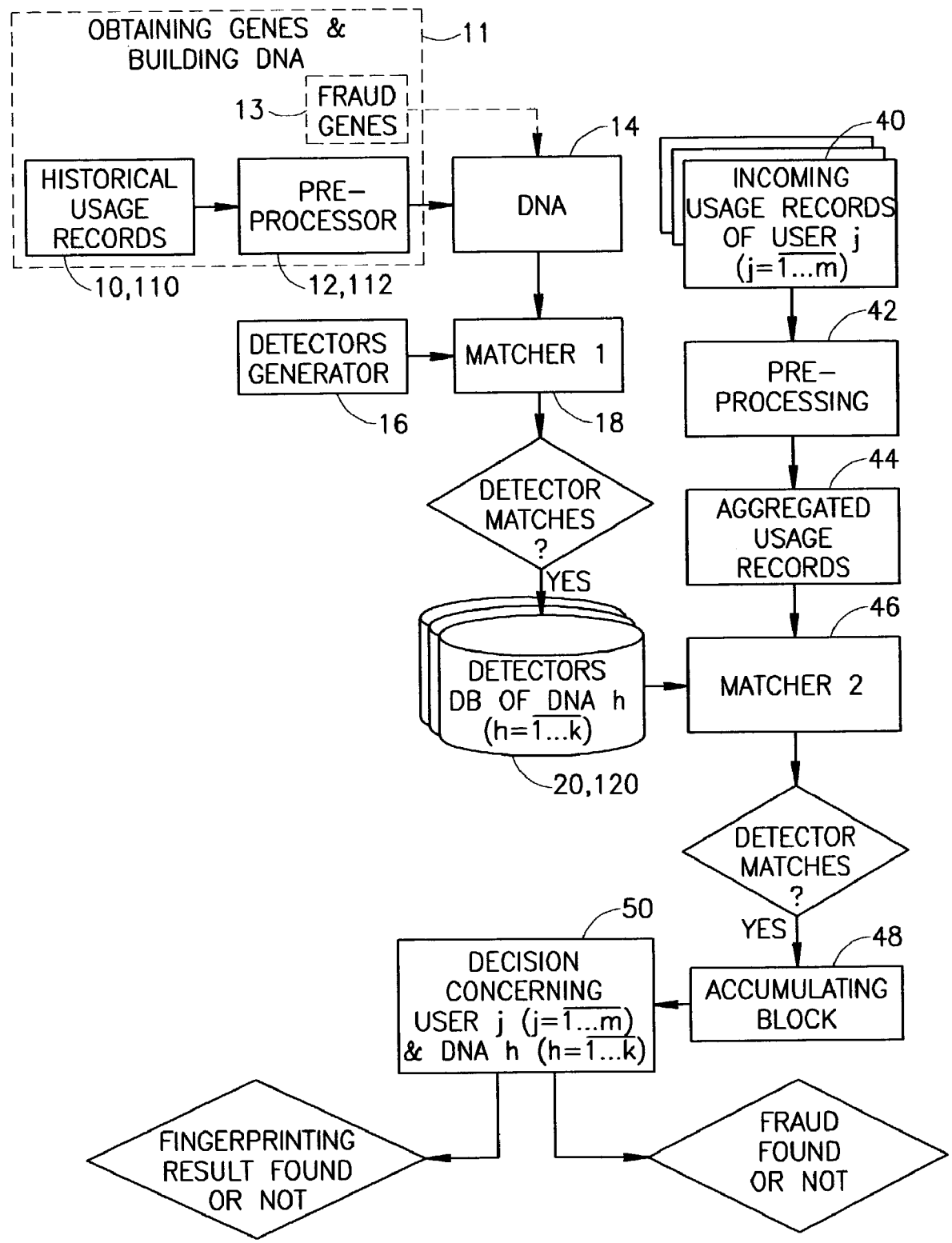
FIG. 3 illustrates a block-diagram of a fingerprinting method and a fraud detection method, based on the principle of Immune Engineering.

FIG. 3 illustrates a combined and more detailed block-diagram according to which the trained system (such that has accumulated characterizing detectors of a particular type of behavior or of a particular fraud) may detect whether a new incoming data, in the form of newly incoming usage records, matches the particular behavior (normal or fraudulent) to which the system was trained in advance. In other words, FIG. 3 is a combination of FIG. 1a (1b) with FIG. 2 and is drawn for illustrating both the fingerprinting principle, and the principle of fraud detection. Block 11 indicates a general operation of obtaining genes for building DNA. It can be done by analytical pre-processing the historical usage records (blocks 10, 12 or 110, 112) as it is done in the fingerprinting technology, but can be done by direct selecting fraud genes for building fraud DNA in the technique of fraud detection. For each DNA (a plurality 1 ... k of DNAs for various types of behavior may be built in the system), a set of detectors is created and such sets are respectively stored in the detectors' multiple data bases schematically marked 20, 120.

To compare the new incoming data of various clients 1 ... m to the stored detectors, the respective incoming usage records 40 are pre-processed (block 42) into so-called incoming aggregated usage records (blocks 44). The aggregated usage records are built per client, during some period of time (which is not obligatory the same as that used for building DNA) and using the same pre-processing procedure (block 42 is equivalent to block 12). The aggregated usage records (44) are further compared to all specific collections of detectors which had been stored in the detectors data bases (20, 120) during the training process. Namely, a second matcher block (46) is responsible for comparing fields in a particular accumulated usage record 44 relating to a particular client (j) with at least one set of detectors of DNAh stored in the detectors data base 20. Actually, the aggregated usage record 44 of a particular client can be and is compared to all sets 1 ... k of the detectors. If a considerable number of detectors of a specific set stored in the detectors' databases 20, 120 coincide with the respective fields of the aggregated records (second matcher 46), that user (j) for which the aggregated records have been built can be a candidate for matching the fingerprinting criteria with the client for which the set of detectors had previously been formed in the detectors database. If that specific set of detectors is a set of fraud detectors, the user (j) is found to perform the fraud known to the system. The decision concerning a particular client and each specific DNA is made at a decision block 50.

One version of the decision making will be described using the Example 1 from FIG. 1a:

Let, a period of time is set for searching. During this period, there comes a call from an unknown originating number (i.e., not having any bad or good history) and the usage record of the call is processed as follows:

1238 (the 4-digits code of the terminating number), type is 10 (voice), duration is 10': 1238, 10, 10'.

Suppose that we check the calls each hour, and each hour add new information to the aggregated record.

Let, the next hour two calls are added to the aggregated record:

2381, 10, 20', and 1238, 10, 2'.

Now, we may build the aggregated usage records (44) which will remind, by format, a newly built DNA string:
1238(2), 2381(1): 10 (3): 10' or 20' or 2'

Or, by the originating numbers, the aggregated usage records are as follows:
1238(2), 10, 10' or 20';
2381, 10, 2'.

A number of the fields which coincide to the detectors stored in the detectors database will indicate the degree of closeness of the unknown client's behavior to the behavior to which the system was trained.

The results of comparison the aggregated records to detectors are accumulated in an accumulating block 48:

a) for the number 1238: 9(2), 1(2), 1, which means:
    nine detectors in the data base 20 coincided to the terminating number, and the number was repeated twice;
    one detector of the type of call coincided twice;
    the call duration matches, and this fact is marked by "1";
b) for the number 2381 no detectors coincided to the termination number, and the call from the number 2381 is excluded from the analysis. Finally, to obtain the conclusion of the decision block 50 whether the fingerprinting found or not found, we may statistically estimate the representative results, and consider that ⅓-rd activity of the unknown number seems matching to the trained criteria (i.e., 66%). The decision threshold should be selected in advance, to convert the obtained probability into a decision.

Further, incoming records of other clients can be checked in a similar manner, and for each client there will be obtained an estimate as of the number of fields in the aggregated record which coincided with the detectors stored in the data base 20. At last, one or more clients will be found, that match the fingerprinting criteria according to a predetermined number of detectors in the detectors' data base coinciding to the fields of the clients' aggregated usage record.

Another version of processing the incoming usage records, matching and decision making will be described using Example 2 from FIG. 1b.

Pre-reprocessing of incoming URs will be performed as follows. Suppose that we received incoming URs that were generated in the previous 10 days. These URs will be aggregated according to the calling numbers. Let us suppose that these URs came from two different calling numbers. These calling numbers are respectively pre-processed as 1022 and 1033. The calling numbers represent two different clients, and two aggregated URs will be built for these two numbers.

There were 160 URs with calling number 1022 in which:
The following terminating numbers were called respectively pre-processed as:
    1235 (40 times); 2122 (20 times); 2033 (50 times);
    3333 (20 times); 8767 (10 times); 9191 (10 times);
    9001 (10 times);
The following services were used:
    10 (100 times); 25 (60 times)
The following area codes were called:
    02 (70 times); 001516 (40 times); 04 (20 times);
    06 (10 times); 08 (10 times); 09 (10 times)
There were 200 URs with calling number 1033 in which:
The following terminating numbers were called, and respectively pre-processed as:
    1000 (20 times); 3434 (10 times); 1212 (60 times);
    1984 (80 times); 2222 (20 times);

The following services were used:
    10 (50 times); 25 (150 times);
The following area codes were called:
    02 (50 times); 09 (80 times); 052 (40 times); 08 (30 times);

Matching of the Preprocessed URs Versus Different DNAs, Including the Fraudster DNA.

We will match every preprocessed (aggregated) UR versus the stored DNAs, including the Fraudster DNA, using the following algorithm:

For each preprocessed (aggregated) usage record from j=$\overline{1...m}$, where j—index of aggregated usage record, m—the number of new users to be studied, we will set all the gene-counters of all the pre-built DNAs to zero.

For each pre-built DNA from h=$\overline{1...k}$, where h—index of DNA's entry and k—number of pre-built DNA, and for each gene in the DNA i=$\overline{1...n}$, where i—index of gene in the DNA, n—number of genes in the DNA, the following comparison is provided with a field "i" in the aggregated UR: If the field's "i" value content (from aggregated usage record UR j) is included in (sufficiently close to) i from DNA h, and thus matches to detectors in the detectors data base, increase the gene-counter of gene i from DNA h by the number of appearances multiplied with the Weight parameter.

Based on the above method, we received the following results of matching.

1. Matching Results of the Calling Number 1022 Preprocessed UR Versus the Fraudster DNA (2):

For terminating numbers genes, according to matching detectors:
1235: 40*1.05; 2122: 20*0.95; 2033: 50*1.36
    Matching result for terminating numbers:
        (40*1.05)+(20*0.95)+(50*1.36)=129
    For services genes, according to matching detectors:
10: 100*1.24; 25: 60*0.4
    Matching result for services:
        (100*1.24)+(60*0.4)=148
    For area codes genes, according to matching detectors:
02: 70*1.14; 001516: 40*0.97
    Matching result for area codes:
        (70*1.14)+(40*0.97)=118.6

2. Matching Results of Calling Number 1033 Preprocessed UR Versus Fraudster DNA (2):

For terminating numbers' genes, according to matching detectors:
1000: 20*0.11; 3434: 10*0.52
    Matching result for terminating numbers:
        (20*0.11)+(10*0.52)=7.4
    For services genes, according to matching detectors:
10: 50*1.24; 25: 150*0.4
    Matching result for service:
        (50*1.24)+(150*0.4)=122
    For area codes, according to matching detectors: 02: 50*1.14, and Matching result for area codes: (50*1.14)=57

To determine whether there is a Match (i.e., whether the Fraudster was detected), we will analyze the matching results from the preprocessed URs versus the Fraudster DNA.

We will set the threshold of suitable matching percent to 0.7. Then, we will define a so-called Matching Percent Function (MP):

Prior Definitions:
    n=Number of genes in DNA and fields in UR
    m=Number of usage records UR corresponding to m users to be studied
    $c_i$=Matching counter of gene i, i=$\overline{1...n}$. Number of matching between the aggregate UR field i values and the best-matched DNA's gene i. Each match is multiplied with the relevant weight parameter.

The Matching Percent (MP) Function's Description:

$$MP = \frac{\sum_{1}^{n} c_i}{n*m}$$

Based on the above, we will calculate the matching percent MP of every preprocessed UR versus the Fraudster DNA, using the Matching Percent Function:

$$MP \text{ of calling number } 1022 = \frac{129 + 148 + 118.6}{3*160} = 0.82$$

$$MP \text{ of calling number } 1033 = \frac{7.4 + 122 + 57}{3*200} = 0.31$$

The MP of the calling number 1022 is suitable (higher then the threshold), so the person that is calling from number 1022 is suspected, by the fingerprint engine, as the Fraudster.

The above examples illustrate that, using the Immune Engineering approach, a fingerprint engine can be trained to a known fraudster, and thereby can become able to detect the known fraudulent behavior when the fraudster renews the activity under a different identity.

The same data and procedure, as has been just described in Example 2, can be applied for illustrating how the fraud detection is performed in the Example 3. Suppose, we build the fraud DNA using the same data and procedure. In such a case, the matching percent for number 1022 (0.82), exceeding the threshold of 0.8, will mean that behavior of the client having the calling number 1022 corresponds to the known fraud type in the system. The example similar to the fingerprinting technique is taken for the sake of simplicity, but other parameters (genes) can form the fraud DNA.

FIGS. 4a-4d illustrate, in the form of tables, various kinds of usage records which can be used in a network for fingerprinting and/or fraud detection. In practice, in new generation networks which combine various services, more than one kind of usage records can be analyzed to build a characterizing combined DNA of a particular client or fraudster. Each of the tables comprises a list of fields (parameters) of the usage record, which is usually stored in the usage record data base for this specific type of service. The tables also point out the type of each field that is usually coded by a number, and describe how the value of the parameter will be indicated in the field.

For example, for modern cellular networks, a client's complex activity may be recorded by: bandwidth usage records (FIG. 4c), Voice usage records (FIG. 4a) and, if the cellular network enables transmitting data to IP networks, the client's activity records may be completed using IP flows usage records (FIG. 4d) and Login usage records (FIG. 4b). Therefore, DNA of such a client using the cellular network may be built using all kinds of the usage records shown in FIGS. 4a-4d. The resulting DNA will be a combination of genes corresponding to several of the mentioned fields.

Though the invention has been described with reference to particular non-limiting examples, it should be appreciated that other versions of the method can be proposed and should be considered part of the invention that is defined by the claims, which follow.

The invention claimed is:

1. A method for identifying a particular user as a fraudster wherein said user is operative in a surrounding including at least one telecommunication network that enables provision of at least voice type of services, characterized by
    providing a plurality of data strings each based upon a characteristic of a user wherein said plurality of data strings have been previously associated with a respective behavior of a known fraudster; and
    in newly incoming information individually detecting a data string being substantially identical to one of said plurality of data strings that is based upon a characteristic of a user and has been previously associated with a behavior of a known fraudster.

2. The method according to claim 1, wherein said at least one telecommunication network further enables provisioning of data services.

3. The method according to claim 1, comprising the steps of:
    a) analyzing fraudulent behavior associated with said fraudulent entity by building a data string characterizing said behavior and called DNA, the data string comprising two or more data sub-strings characterizing fragments of the fraudulent behavior and called genes;
    b) selecting two or more data fragments called detectors and being substantially similar to said data sub-strings respectively;
    c) applying said detectors to identify similar data fragments in newly incoming information concerning activity in the surrounding; and
    d) based on the identification results, judging whether said newly incoming information contains said genes, thereby constituting behavior of interest.

4. The method according to claim 3, being a Fingerprinting method for detecting the fraudulent behavior, wherein said DNA characterizes the fraudulent behavior of a particular customer, and said genes characterize the behavior fragments of said customer.

5. The method according to claim 4, wherein in the Fingerprinting method, the DNA reflects either a normal or a fraudulent behavior of interest of the customer.

6. The method according to claim 3 for detection of a specific type of fraud in the surrounding, wherein said data string characterizes a known fraudulent behavior in the surrounding and is called a fraud DNA, and wherein said data sub-strings characterize fragments of the fraudulent behavior of interest and are called fraud genes.

7. The method according to claim 6, for fraud detection in the surrounding, comprising:
    in step (b), selecting said one or more fraud genes to be the fraud detectors and storing thereof in a fraud detectors' data base, in step (c), creating aggregated usage records of a number of respective customers using newly incoming information stored in real time data bases, by preprocessing and selecting, for each of said aggregated usage records, data fragments reflecting fragments of behavior of the corresponding customer; and
    comparing each of the aggregated usage records with contents of the fraud detectors' data base, in step (d), confirming the fraud detection whenever defining the aggregated usage records of at least one customer, comprising a number of data fragments matching said fraud detectors, wherein said number exceeds a predetermined matching percent.

8. The method according to claim 3, comprising the building of said DNA by pre-processing information known in advance that presents the behavior of interest in the surrounding, thereby creating a binary succession comprising two or more binary sub-strings reflecting fragments of said behavior of interest and called genes.

9. The method according to claim 8, wherein the building of said DNA comprises creating a chain of said genes and providing separation marks in the chain.

10. The method according to claim 8, wherein said genes reflect two or more fragments of behavior of interest, selected from the following list including: a terminating telephone number used, frequency of use of a terminating number, duration of calls, IP address, frequency of use of IP address, type of call, bandwidth characteristics of a call, start time of a call, login strategy.

11. The method according to claim 8, wherein the building of the DNA comprises associating weight coefficients with the genes.

12. The method according to claim 3, wherein the step (b) comprises selecting a set of one or more said detectors each being a data fragment relevant to the DNA; the detector being considered relevant when it is substantially similar to a particular gene of said DNA.

13. The method according to claim 12, wherein a particular detector is considered relevant to the DNA if the detector has length L equal to the length of a particular gene of the DNA and comprises "r" contiguous bits of said gene (where r<L).

14. The method according to claim 12, wherein the step (b) of selecting the detectors comprises randomly generating data fragments of various lengths and comparing thereof with genes of the DNA to select from them relevant detectors for the set.

15. The method according to claim 12, wherein the step (b) of selecting the detectors comprises generating data fragments relevant to the DNA.

16. The method according to claim 3, wherein step (c) comprises applying the selected detectors to perform analysis of newly incoming information representing activity of an arbitrary customer in said surrounding.

17. The method according to claim 16, wherein the newly incoming information is obtained from one or more real time data bases of the surrounding.

18. The method according to claim 16, wherein:
the building of said DNA comprises pre-processing information known in advance that presents the behavior of interest in the surrounding, to create a binary succession comprising two or more binary sub-strings reflecting fragments of said behavior of interest and called genes; and the newly incoming information is preliminarily pre-processed by extracting from it data fragments in the manner similar to pre-processing data for building the DNA, collecting and processing the extracted fragments into aggregated usage records, and applying said detectors by comparing the aggregated usage records with the selected detectors to determine a percent of detectors of the set matching to the fragments of said aggregated usage records.

19. The method according to claim 18, further comprising in step (c), predetermining a critical percentage of the detectors of the set matching to said aggregated usage records, and, in step (d), considering behavior of said arbitrary customer to match to the behavior of interest characterized by the DNA, if said critical percentage is reached.

20. The method according to claim 3, wherein step (b) of selecting the detectors comprises:
generating a plurality of different data fragments respectively suitable to the sub-strings of the characterizing data string (DNA) by having respectively the same lengths as said sub-strings;
matching each of the generated data fragments with said string, considering one or more of the generated data fragments to be detectors if matching a particular sub-string of the DNA at least partially, storing thus obtained detectors in the detector's database.

21. The method according to claim 3, in step (b) further comprising creating at least one detectors' database from the following non-exhaustive list:
detectors' data base for a fraudulent behavior of a customer X in the surrounding;
detectors' data base for specific normal behavior of a customer Y in the surrounding;
fraud detectors' data base for particular types of fraudulent behavior in the surrounding;
detectors' data base for normal behavior in the surrounding.

22. The method according to claim 21, comprising, in step (b), continuous generation of the detectors for updating said at least one detectors' data base from time to time.

23. The method according to claim 22, further comprising updating said at least one detectors' data base, based on frequency of use of each particular detector of the data base when comparing it with the newly incoming information.

* * * * *